US009752273B2

(12) United States Patent
Babbitt et al.

(10) Patent No.: US 9,752,273 B2
(45) Date of Patent: Sep. 5, 2017

(54) BARRIER DENSIFIED FLUID CLEANING SYSTEM

(71) Applicant: CO2Nexus, Inc., Littleton, CO (US)

(72) Inventors: Guy Robert Babbitt, Littleton, CO (US); Andrew Timothy Maxey, Littleton, CO (US); Ernst Jan Siewers, Littleton, CO (US); Stuart Parker, Littleton, CO (US); Nicholas Paul Echter, Littleton, CO (US)

(73) Assignee: CO2Nexus, Inc., Littleton, CO (US)

( * ) Notice: Subject to any disclaimer, the term of this patent is extended or adjusted under 35 U.S.C. 154(b) by 149 days.

(21) Appl. No.: 14/749,056

(22) Filed: Jun. 24, 2015

(65) Prior Publication Data

US 2015/0368855 A1  Dec. 24, 2015

Related U.S. Application Data

(63) Continuation of application No. 13/741,925, filed on Jan. 15, 2013, now Pat. No. 9,091,017.

(Continued)

(51) Int. Cl.
*D06F 43/00* (2006.01)
*D06F 43/02* (2006.01)
(Continued)

(52) U.S. Cl.
CPC .......... *D06F 43/007* (2013.01); *B08B 7/0021* (2013.01); *D06F 43/00* (2013.01);
(Continued)

(58) Field of Classification Search
CPC . D06F 1/00; D06F 43/00; D06F 43/02; D06F 43/007; B08B 7/0021
See application file for complete search history.

(56) References Cited

U.S. PATENT DOCUMENTS 3,318,122 A * 5/1967 Starr ..................... D06F 23/02
68/12.18
5,013,366 A * 5/1991 Jackson ................... C23G 5/00
134/1

(Continued)

FOREIGN PATENT DOCUMENTS

DE        3416424 A1    11/1985
DE     19922195 A1    11/2000

(Continued)

*Primary Examiner* — Joseph L Perrin
(74) *Attorney, Agent, or Firm* — Martensen IP

(57) ABSTRACT

A densified fluid barrier cleaning system is disclosed in which a pressure vessel encases a movable basket positioned so as to cross a barrier such that one opening of the pressure vessel resides in a first environment and a second opening of the pressure vessel resides in a second environment. A tubular basket within the pressure vessel is positioned such that its central longitudinal axis is aligned with both the first and second opening of the pressure vessel. Responsive to the successful completion of a cleaning cycle, soiled articles that are introduced to the basket via the first opening from the first environment can be removed through the second opening and into the second environment thus bridging the barrier without fear of introducing contaminants from the first environment to second environment.

11 Claims, 10 Drawing Sheets

Related U.S. Application Data

(60) Provisional application No. 61/587,278, filed on Jan. 17, 2012.

(51) Int. Cl.
 *D06F 43/08* (2006.01)
 *D06L 1/00* (2017.01)
 *B08B 7/00* (2006.01)
 *F16J 13/08* (2006.01)

(52) U.S. Cl.
 CPC ............ *D06F 43/02* (2013.01); *D06F 43/081* (2013.01); *D06L 1/00* (2013.01); *F16J 13/08* (2013.01)

(56) References Cited

U.S. PATENT DOCUMENTS

| | | | |
|---|---|---|---|
| 5,267,455 A | 12/1993 | Dewees et al. | |
| 5,467,492 A | 11/1995 | Chao et al. | |
| 5,904,737 A | 5/1999 | Preston et al. | |
| 6,098,430 A * | 8/2000 | McClain | D06F 37/28 68/140 |
| 6,237,374 B1 | 5/2001 | Malchow et al. | |
| 6,314,601 B1 * | 11/2001 | McClain | D06F 43/007 68/18 C |
| 6,442,980 B2 * | 9/2002 | Preston | D06F 43/00 134/107 |
| 6,481,247 B1 * | 11/2002 | Fedegari | B08B 3/12 68/139 |
| RE38,001 E | 2/2003 | Adler et al. | |
| 6,523,204 B1 * | 2/2003 | Maziere | D06F 33/02 134/113 |
| 6,821,356 B1 * | 11/2004 | Wandke | B08B 7/0021 134/120 |
| 6,849,094 B1 | 2/2005 | North | |
| 6,860,123 B1 | 3/2005 | Uhlin | |
| 6,898,951 B2 * | 5/2005 | Severns | B01J 20/28033 68/17 R |
| 6,982,007 B2 * | 1/2006 | Worm | D06F 43/00 134/11 |
| 7,621,965 B2 | 11/2009 | Motson | |
| 7,841,216 B2 * | 11/2010 | Uhlin | D06F 43/02 68/140 |
| 2005/0034247 A1 * | 2/2005 | Uhlin | D06F 43/08 8/142 |
| 2008/0223406 A1 | 9/2008 | Lindqvist et al. | |

FOREIGN PATENT DOCUMENTS

| | | |
|---|---|---|
| EP | 0564396 A1 | 10/1993 |
| JP | H07-508904 A | 10/1995 |
| JP | 2002-540823 | 12/2002 |
| WO | WO0063483 A1 | 10/2000 |

* cited by examiner

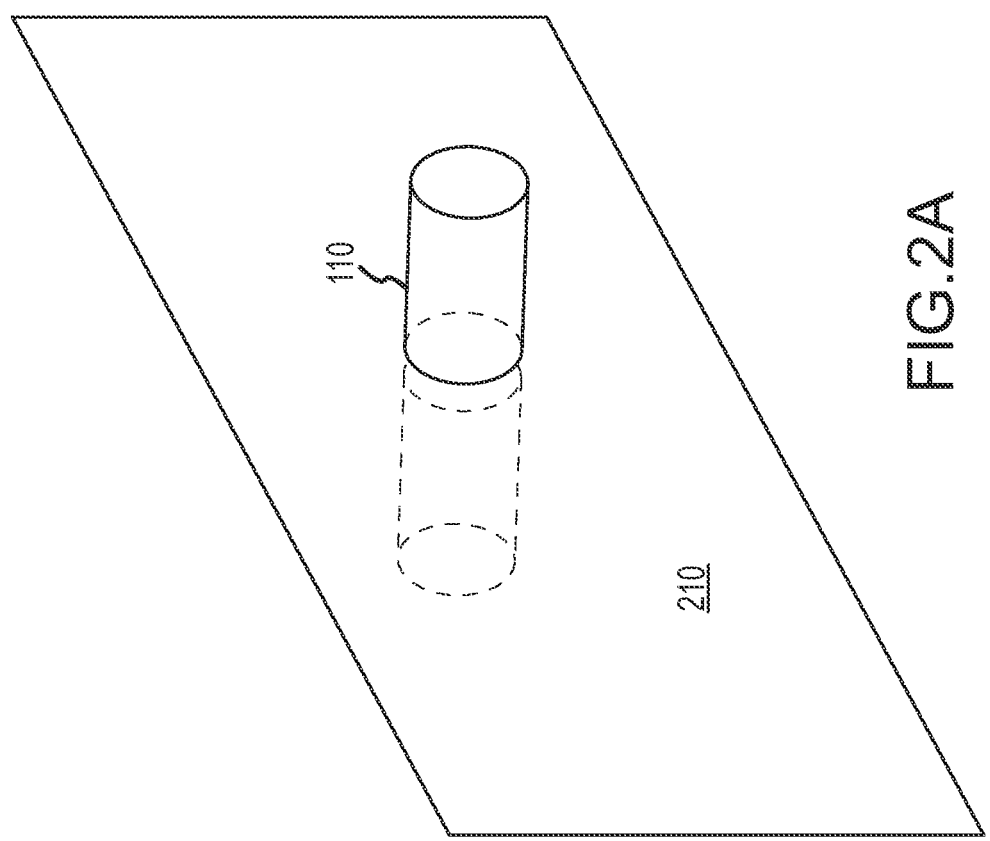

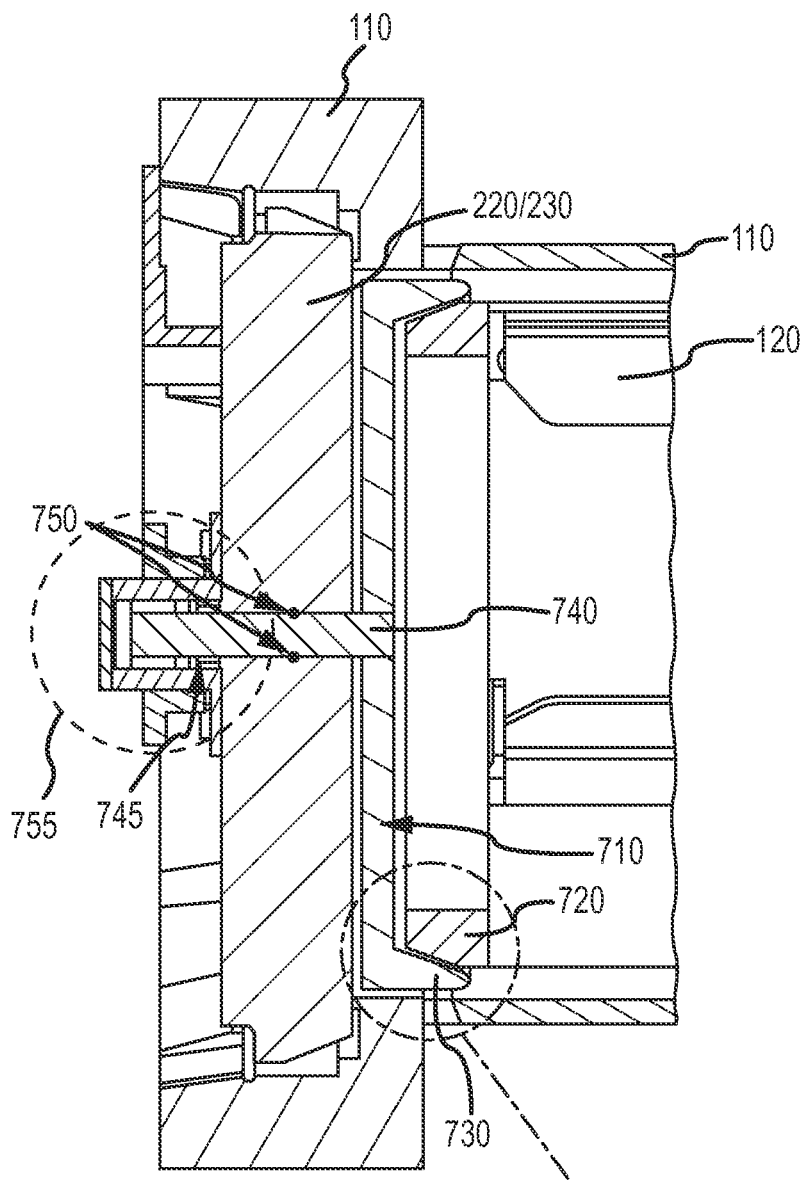
FIG.7
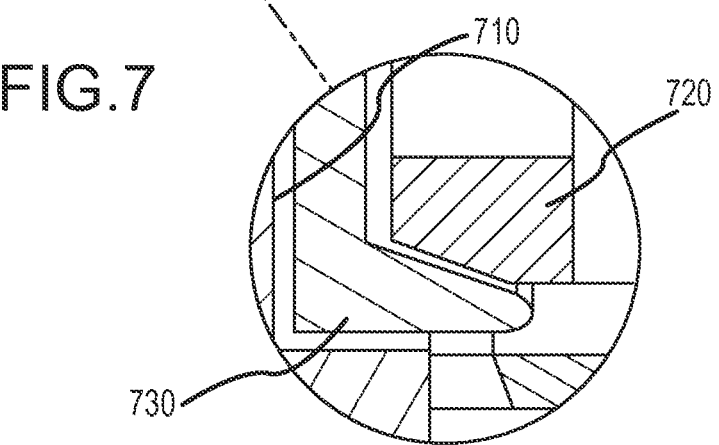

BARRIER DENSIFIED FLUID CLEANING SYSTEM

RELATED APPLICATION

The present application is a continuation of and claims benefit of priority to U.S. patent application Ser. No. 13/741,925 filed Jan. 15, 2013 which relates to and claims the benefit of priority to U.S. Provisional Patent Application No. 61/587,278 filed Jan. 17, 2012, both of which are hereby incorporated by reference in their entirety for all purposes as if fully set forth herein.

BACKGROUND OF THE INVENTION

Field of the Invention

Embodiments of the present invention relate, in general, to using densified fluid as a primary solvent to process articles and more particularly to systems and methodology for using liquefied carbon dioxide to process (clean) textiles across a barrier separating two distinct environments.

Relevant Background

Traditionally the cleaning of textiles involves two basic approaches; a traditional water-based or a dry-cleaning method in which water is replaced by trichlor-ethylene or perchlor-ethylene (PCE, aka PERC). Generally articles of clothing or textiles are placed in a treatment drum of a washing machine in which clean fluids, water based or otherwise, are added. The drum agitates the combination of the cleaning fluids and textile to aid in the breakdown and removal of contaminates. Thereafter the solvent is drained carrying with it containments originally found in the textiles. The process for dry cleaning is essentially the same but for the fact that the solvent used to clean the textiles is not water based but a chemical solution. These dry cleaning solutions are, from an environmental standpoint, not environmentally friendly and are also associated with health and safety risks. PCE for example is a suspected carcinogen and petroleum-based solvents are flammable as well as being linked to ozone depletion.

While there exists numerous cleaning systems and numerous environments in which they operate, the demands of cleanliness associated with a clean room environment are particularly challenging.

A clean room is an environment typically used in manufacturing or scientific research that has a low level of environmental pollutants such as dust, airborne microbes, aerosol particles and chemical vapors. More accurately, a clean room has a controlled level of contamination as specified by the number of particles per cubic meter at a specified particle size. For example, ambient air outside in a typical urban environment contains 35 million particles per cubic meter in the size range of 0.5 µm and larger in diameter. Such an environment corresponds to an ISO 9 clean room while an ISO 1 clean room allows no particles in that size range at all and only 12 particles per cubic meter of 0.3 µm and smaller size range.

One approach to textile cleaning that can meet clean room environment standards is the use of liquid carbon dioxide as the cleaning medium. An exemplary carbon dioxide cleaning system is disclosed in the U.S. Pat. No. 4,012,194. In this patent a simple cleaning process is disclosed in which textiles are placed in a cylindrical vessel to which carbon dioxide is introduced. The liquid carbon dioxide passes through the textiles, removing soil and is thereafter passed to an evaporator. The evaporator vaporizes the carbon dioxide leaving the soil or other contaminants behind. The carbon vapor dioxide is thereafter pumped to a condenser after which the liquid carbon dioxide is produced and thereby returned to a refrigerated storage tank for later use. Other dry cleaning systems using similar technology and processes are widely known. In such technologies a pressure vessel in which liquid carbon dioxide is introduced is generally maintained between 300 to 1000 PSI. Additional additives, such as organic solvents, may be supplemented to the liquid carbon dioxide to enhance the cleaning experience. And once a cleaning cycle has been completed the pressure vessel is depressurized and clean textiles removed. Despite the ability of a system such as the one presented above to effectively clean textiles it faces a fundamental flaw in that the textiles, once cleaned as a result of its process, are immediately introduced into a dirty environment that places the textiles "cleanliness" into question.

Clean rooms can be very large. For example entire manufacturing facilities can be contained within a clean room environment and have factory floors covering thousands of square meters. Such environments are used extensively in semiconductor manufacturing, aerospace, biotechnology, life sciences and other fields that are very sensitive to environmental contamination. Typically the air entering a clean room from the outside is filtered to exclude dust, and the air inside is recirculated through high-efficiency particulate air filters to remove internally generated contaminants. Staff enter and leave through air locks (sometimes including an air shower stage), and wear protective clothing such as hoods, face masks, gloves, boots and coveralls. Equipment inside the clean rooms are designed to generate minimal air contamination and clean room furniture is designed to be easily cleaned. Common materials such as paper, pencils, and fabrics made from natural fibers are often excluded, and alternatives are used. Moreover, clean room environments are often kept at a positive pressure so that if there are any leaks air escapes outward rather than contaminated air being allowed to enter the clean environment. Also, many clean rooms include an anterior room (known as a "grey room") in which clean room clothing must be put on prior to entry and from which a person can walk directly into the clean room and begin work.

One important consideration in a clean room environments is textiles. It is important to note that because the human body produces so many contaminants in such large quantities, the maintenance and the supply of clean room apparel is critical and such textiles can easily be overwhelmed by contaminants. Accordingly clean room textiles are changed and cleaned frequently and textile cleaning system configurations are often evaluated for the level of cleanliness desired. Indeed the entire construction and maintenance of a clean room environment often includes a textile configuration and clean room plan to address the maintenance and testing of clean room apparel. For example it is conceivable that each worker in a clean room environment must use a new clean room textile upon each entry into the environment. Thus a large manufacturing facility could find the need for hundreds of clean room textiles each day. Over several years the contamination control industry has produced innovative systems and apparel to assist humans working in clean room environments thereby protecting the product and the processes from contamination. However, as alluded to above, these systems (textiles) require care and vigilant attention.

Clearly one critical step in producing a clean room textile is validation of a clean room textile supply and cleaning system. Such evaluation and validation often includes a complete audit of the textile system supplier site and the processes used to supply clean room textiles. While such a supplier may possess the capability of producing clean room textiles at a specified level of cleanliness for a required clean room environment, one has to consider not only the cleaning process but also the environment in which the cleaning takes place as well as packaging and transport. For example the removal of a clean textile from the cleaning apparatus into a non-clean room environment places the certification and validity of the clean textile at risk. Indeed the facilities cleaning and packaging the clean room textiles must be at or better than the same cleanliness standard of the targeted clean room or risk the likely possibility that the mere introduction of supposedly "clean" textiles into a dirty environment is, by itself, introducing unacceptable contaminants.

One limitation of the prior art therefore is that in each case of the prior art the introduction and removal of the textiles occurs through the same environment. That is to say, the clean textiles removed from the cleaning apparatus are introduced into an unclean environment. While for a typical cleaning process such an introduction of clean textiles into a non-clean environment is not significant, for textiles destined for a clean room environment the mere transport of cleaned textiles within a non-clean environment can introduce contaminants that may defeat the entire purpose of having such a extensive cleaning process. Such situations are typical in environments in which contaminants on the order of a few particles per million require the rejection of a textile. Examples include certain semiconductor, electronic and pharmacology locations.

What is needed therefore is an apparatus and associated methodology for cleaning articles using densified gas such as liquid carbon dioxide wherein soiled articles are introduced to the apparatus from a first environment and the clean articles are removed from the device into a separate clean environment. These and other challenges of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

A densified fluid cleaning system that spans a barrier is hereafter described by way of example. Broadly defined a barrier is a physical medium such as wall or similar structure that separates one environment from another. According to one embodiment of the present invention, a densified fluid cleaning system is positioned across such a barrier so as to provide access to the cleaning apparatus from two separate and distinct environments. The cleaning system of the present invention utilizes a densified fluid such as a liquid carbon dioxide or similar liquefied gases as a medium by which to remove contaminants. A pressure vessel that is substantially cylindrical includes separate sealable openings so that the vessel can be accessed by both the first and a second environment. Within the cylindrical pressure vessel exists a manipulable basket which aids in the interaction between the articles being cleaned and the densified fluid.

The basket, which is positioned within the pressure vessel, is, according to one embodiment of the present invention, tubular in nature so as to provide accessibility to the articles being cleaned from both the first and the second environment. To facilitate mobility of the basket within the pressure vessel, a support structure is provided to enable the basket to move freely while maintaining easy access to articles contained within a basket both during loading and removal. According to one embodiment of the present invention the basket is supported by a pair of rotatable actuators, one coupled to each sealable door on the end of the pressure vessel. As the actuator engages the basket, an axis on which the basket can rotate is aligned with a fixed axis of the actuator. The actuator fixed axis being defined by a line between the two rotatable actuators. The actuator further traverses, in one embodiment, each sealable door and is housed within a bearing assembly to enable the basket/actuator combination to rotate freely within the pressure vessel. In one embodiment of the present invention a drive system engages the actuator and thus the basket to provide for the necessary interaction between the articles within the basket and the densified fluid. In one embodiment, the actuator and sealable door are integrated components and act as a single unit while in other embodiments the actuator and sealable door are separate and operate independently.

In other embodiments of the present invention the basket can be supported within the pressure vessel by a series of rollers or roller systems interposed between the interior surface of the pressure vessel and the exterior surface of the basket. The basket can also be suspended from the pressure vessel using a stub shaft coupled to each longitudinal end of the basket in another embodiment. As one of reasonable skill in the relevant art will appreciate other implementation techniques may be used to facilitate the ability of the basket to move within the pressure vessel. For example, rather than rotating the baskets about a fixed axis the basket may be positioned within the pressure vessel such that it can translate or vibrate and yet still provide mechanical interaction between the articles contained therein and the densified fluid medium.

According to one method embodiment of the present invention a densified fluid cleaning system is positioned across a barrier separating a first environment from a second environment. Such a process begins with placing soiled articles within a pressure vessel from a first, "dirty," environment. The soiled articles are placed within the pressure vessel via a sealable door and into a basket positioned within the interior of the pressure vessel. With the articles located within the basket the sealable door interfacing with the first, "dirty", environment is closed and a densified fluid is introduced into the pressure vessel. Thereafter one or more processes take place in which the articles and the densified fluid (and additional additives as necessary) interact and accordingly clean the articles. Responsive to the completion of the cleaning cycle, the densified fluid is drained from the pressure vessel and the vessel depressurized. Upon depressurization the now clean articles are accessed through a second sealable door within a second, "clean" environment. Control systems are established to prevent the inadvertent contamination of the clean environment. Therefore only at the completion of the cleaning process can the articles be accessed from the clean environment.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein:

FIG. 7 is a cut away side view of a sealable door and an actuator used to position and align a movable basket according to one embodiment of the present invention;

Figure 1:
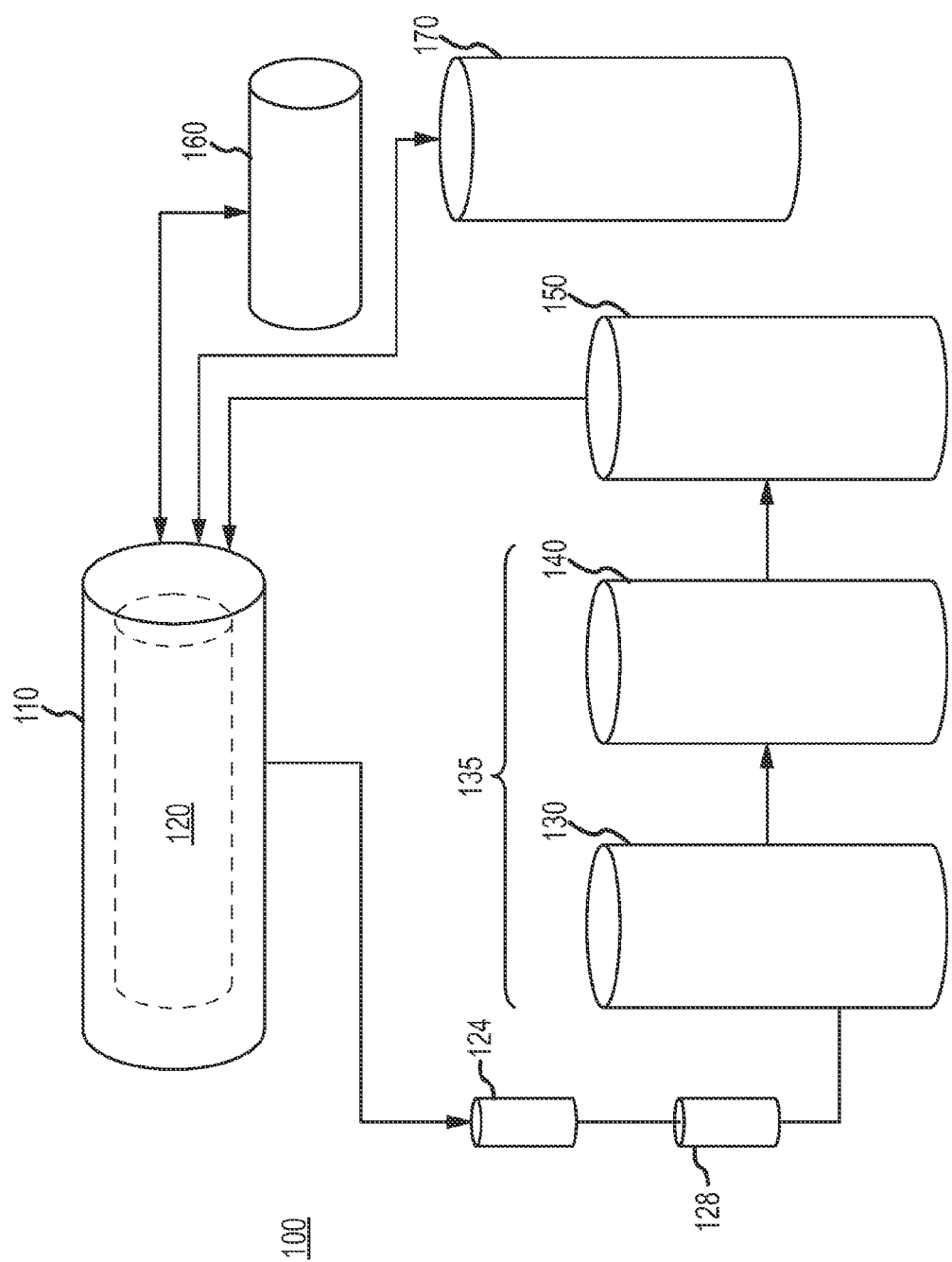
FIG. 1 is a high-level depiction of a barrier densified fluid cleaning system according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Described hereafter by way of example is a densified fluid barrier cleaning system. According to one embodiment of the present invention a pressure vessel encasing a movable basket is positioned so as to cross a barrier such that one opening of the pressure vessel resides in a first environment and a second opening of the pressure vessel resides in a second environment. A tubular basket within the pressure vessel is positioned, according to one embodiment of the present invention, such that its central longitudinal axis is aligned with both the first and second opening of the pressure vessel. Accordingly and responsive to the successful completion of a cleaning cycle, soiled articles that are introduced to the basket via the first opening from the first environment can be removed, after cleaning, through the second opening and into the second environment thus bridging the barrier without fear of introducing contaminants from the first environment to second environment.

One or more embodiments of the present invention uses liquid carbon dioxide as a densified fluid to clean soiled articles. For the purpose of the present invention the term "cleaning" includes the removal of contaminates, particles and electrostatic charges as well as bacterial inactivation and/or sterilization. A pressure vessel which includes a movable basket contained within is positioned across (traversing) a boundary between a first environment which may be considered dirty and a second environment which may be considered clean. The movable basket within the pressure vessel, according to one embodiment of the present invention, can be configured to provide agitation/interaction between the densified fluid and the soiled articles. Thereafter soiled articles are introduced into the pressure vessel and basket from the first, dirty environment. Once sealed densified fluid is introduced into the basket along with, according to one of the embodiment of the present invention, additional solvents. To enhance the interaction between the soiled articles and the densified fluid the basket moves about its central axis. Much like the basket or tub in a conventional cleaning device, the basket to the present invention agitates the soiled articles within the densified fluid so as to enhance the ability of the densified fluid and any other solvents to clean the articles. Unlike conventional barrier water-based cleaning systems, the present invention utilizes a pressure vessel configuration.

One should note that for purposes of the present invention the term articles should be considered to be inclusive and not exclusive. For example soiled articles can include textiles, garments, hardware, substrates, or other material by which cleaning can be accomplished using densified fluid. Moreover for the purposes of the present application the term fluid is used to describe a gaseous, liquid and/or supercritical state of a substance or any combination thereof.

Typically a substance can be thought of to exist in three distinct phases. These phases or states are commonly known as solid, liquid, or gas. A phase diagram is a graphical representation of the physical states of a substance under different conditions of temperature and pressure. A typical phase diagram has pressure on the Y axis and temperature on the X axis. As one moves across the lines or curves on the graph a substance's phase changes from one to the next. Moreover, the two adjacent phases of a substance can coexist or are in equilibrium on the line separating these regions. The critical point on the graph is a point in the phase diagram in which temperature and pressure are such that the liquid and gaseous phases of the substance are indistinguishable. Beyond this point the temperature and pressure are such that a merged single phase known as is a super critical fluid exists. The distinction between fluid and gas ceases to exist beyond this point and the substance is referred to as a super critical fluid.

Super critical fluids can diffuse through solids like a gas, and dissolved materials like a liquid. In addition, close to the critical point, small changes in pressure or temperature result in large changes in density, allowing many properties of a super critical fluid to be "fine-tuned". Super critical fluids are often used as a substitute for organic solvents in a range of industrial laboratory processes. In general, super critical fluids have properties of both a gas and liquid; super critical fluids (and for that matter densified fluids) can include carbon dioxide, water, methane, ethane, propane, propylene, ethanol, acetone, and ethylene. One significant characteristic of super critical fluids is that there is no surface tension between the liquid/gas phase boundary. By changing the pressure and temperature of the fluid, the properties can be "tuned" to be more liquid or more gas like.

The advantages of super critical fluid extraction (compared with liquid extraction) is that extraction from the textile is relatively rapid because of the low viscosity and high diffusivities. Extraction can be selective to some extent by controlling the density of the medium. Moreover the extracted material is easily recovered by simply depressurizing super critical fluid and allowing the super critical fluid to return to a gas phase. The evaporation process leaves little solid residue behind.

Changes in pressure and temperature can also change the density of a substance such as liquid carbon dioxide. Increasing the pressure always increases the density of a material while increasing the temperature generally decreases the density with some notable exceptions. For example, the density of water increases between its melting point at 0° C. and 4° C. As is commonly know the density of water is greater than that of ice.

The effect of pressure and temperature on the densities of liquids and solids is small. The compressibility for a typical liquid or solid is 10-6 bar-1 (1 bar=0.1 MPa) and a typical thermal expansivity is 10-5 K-1. This roughly translates into needing around ten thousand times more atmospheric pressure to reduce the volume of a substance by one percent. A one percent expansion of volume typically requires a temperature increase on the order of thousands of degrees Celsius. So while the change in density of a liquid is substantially insignificant, the point at which it transitions from a liquid to a gas can be significantly impacted by both pressure and temperature. Therefore a densified fluid (gaseous, liquid or super critical) comprises, for the purposes of this application, a substance or solution that, based on temperature or pressure, varies between gaseous, liquid or a supercritical state. One of reasonable skill in the art will recognize that a densified fluid will, in its liquid state, be coexistent with a gaseous form of the fluid in areas having a free surface such as, for example, the pressure vessel.

Hereafter embodiments of the present invention are described in detail with reference to the accompanying Figures. Although the invention is described and illustrated with a certain degree of particularity, it is understood that the present disclosure is made only by way of example and that numerous changes in the combination and arrangement of parts can be resorted to by those skilled in the art without departing from the spirit and scope of the invention.

Moreover, the following description, with reference to the accompanying drawings, is provided to assist in a comprehensive understanding of exemplary embodiments of the present invention as defined by the claims and their equivalents. It includes various specific details to assist in that understanding but these are to be regarded as merely exemplary. Also, descriptions of well-known functions and constructions are omitted for clarity and conciseness.

The terms and words used in the following description and claims are not limited to the bibliographical meanings, but, are merely used by the inventor(s) to enable a clear and consistent understanding of the invention. Accordingly, unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. Thus, for example, reference to "a component surface" includes reference to one or more of such surfaces.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

It will be also understood that when an element is referred to as being "on", "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Turning attention now to FIG. 1, a high-level depiction of a barrier densified fluid cleaning system according to one embodiment of the present invention can be seen. As shown a basket 120 is enclosed within a pressure vessel 110 and positioned across a barrier used to separate two distinct environments. Coupled to the pressure vessel 120 are various additional components that may be used to obtain a satisfactory and successful cleaning result using a densified fluid. For example the pressure vessel 110 can be coupled to a purge tank 160 from which a gaseous form of a densified fluid can be brought to and from the pressure vessel 110 and the cleaning environment. In addition the pressure vessel 110 can be coupled to one or more storage tanks 170 from which densified fluid can be temporarily stored and supplied to the cleaning process as required.

The barrier cleaning system of the present invention further includes a distillation system 135 comprised of evaporation 130 and condensation 140 components that converts densified fluid into its gaseous form so as to remove any suspended and dissolved contaminants eliminated from the soiled articles and then re-condense the gaseous form of the densified fluid back into its liquid form for further use in the cleaning process. As further shown in FIG. 1, densified fluid collected from the pressure vessel containing various contaminants gained from the soiled articles is passed through a series of mechanical filters 124, 128 and eventually to an evaporator 130 (distiller) wherein the densified fluid is converted from its liquid form to its gaseous form by increase in energy through control of pressure and/or the addition of heat thereby substantially removing any suspended and dissolved contaminants. The now clean gas is then re-condensed into a liquid form in a condenser 140 before being passed to a storage vessel 150.

As one of reasonable skill in the relevant art will appreciate, distillation is a method of separating mixtures based on differences in volatility of components in a boiling liquid mixture. Distillation is a physical separation process and not a chemical reaction. Only when the temperature at which the vapor pressure of the liquid equals the pressure on the liquid do bubbles form without being crushed back into solution. At a basic level, the heating of a volatile mixture of substance A and B (wherein substance A has a lower boiling point) to its boiling point results in a vapor that contains a mixture of A and B. The ratio of A to B in the vapor however will be different than the ratio of A to B in the liquid. In this case the vapor will possess a higher concentration of A since A has a lower boiling point. The vapor can be condensed to fluid form and the process repeated until liquid of a desired purity of A can be achieved.

In one embodiment of the present invention "clean" densified fluid and/or co-solvents (densified fluid combined with other solvents and/or chemical additives) are added to the pressure vessel and used to remove contaminates from soiled articles. The "dirty" fluid is recovered from the vessel and distilled to remove the contaminates and substantially restore the fluid to its "clean" state.

Turning attention back to FIG. 1 and according to one embodiment of the present invention, the evaporator 130 of the distillation system 135 includes an internal heat exchanger. The heat exchanger (not shown) can comprise a coil of heating elements arranged for heat transfer to the densified fluid. The energy source from the heating coil can be derived from various media such as but not limited to densified fluid, steam, hot water, electricity, hot air and/or refrigerant. In another embodiment of the present invention steam can be used as source of heat. The heating coil can also be arranged in a boiling vessel in such a way that the coil is submerged in the densified fluid. It is also noted that a spiral or finned coil design increases the heating capacity by maximizing the heating surface although one skilled in the relevant art will recognize that other designs for a heat exchanger could be utilized to achieve the same result.

The system shown generally in FIG. 1 can, in one embodiment, also include a filtration system to mechanically remove contaminates prior to the distillation process. The densified fluid passes through, in one embodiment, a series of filters 124, 128 including a dye filter, consisting of e.g. activated carbon, to remove dyes and related compounds. Thereafter the densified fluid, in one embodiment, is passed through a distillation system 135.

Figure 2B:
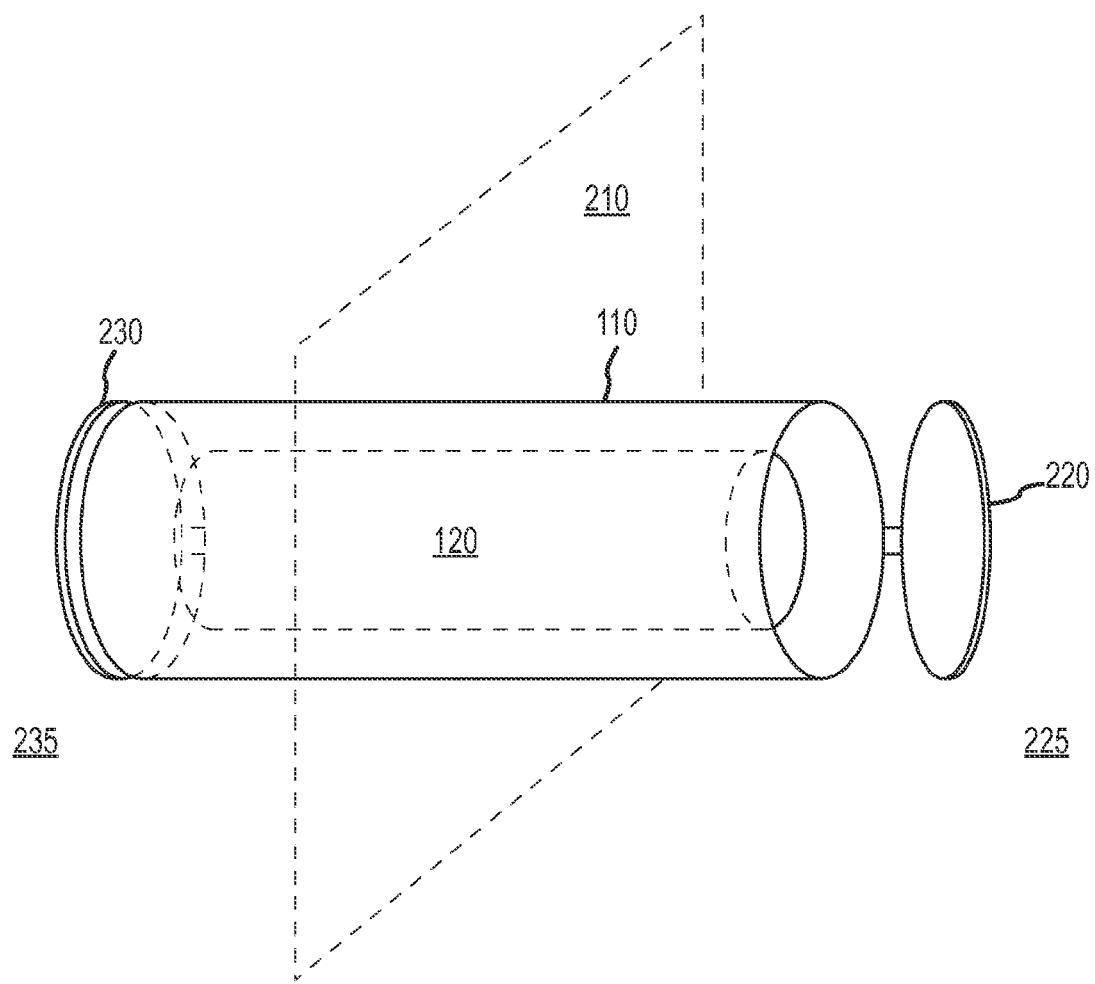
FIGS. 2A and B are depictions of a cylindrical pressure vessel of a densified fluid cleaning system traversing a barrier according to one embodiment of the present invention.

Another aspect of the present invention is shown in FIG. 2 wherein, according to one embodiment, a pressure vessel 110 and its associated basket 120 cross a barrier. In one version of the present invention the pressure vessel 110 and basket 120 are substantially cylindrical such that one end of the cylinder resides in a first environment while the other end resides in the second environment. The barrier 210 separates two distinct environments 225, 235 and ideally represent a delineation between a clean and dirty environment. In one embodiment of the present invention soiled articles are placed into the pressure vessel 110/basket 120 via a first sealable door 220 from a first environment 225. The articles placed into the basket 120 can be retrieved from the vessel 110 via a second sealable door 230 that interfaces with a second environment 235 responsive to the completion of the cleaning process. One contemplated application of the present invention is the placement of the pressure vessel (and associated basket) across a barrier that separates a dirty environment from that of a clean environment such as clean room. The barrier can be any structure that provides for such physical separation.

The present invention provides a system having two distinct access points to the articles being cleaned. A pressure vessel includes two sealable doors in which a first door is accessible by a first environment, or sometimes referred to herein as a "dirty" environment, and a second sealable door accessible from a second "clean" environment. In such an application of the present invention soiled textiles such as those textiles discarded by workers after leaving the clean room environment, are placed into the basket of the cleaning system from the dirty environment while the door to the clean environment remains shut. Once placed into the pressure vessel, the first sealable door is shut and contaminants are removed from the textiles using densified fluids such as liquified carbon dioxide and/or other co-solvents and other chemical additives. One of reasonable skill in the relevant art will appreciate that while liquified carbon dioxide is used throughout the present invention as an example of densified fluid, other substances and other densified fluids can be used in conformance with the concepts presented herein without departing from the scope of the present invention.

Returning to the above example, articles placed within the pressure vessel through the sealable door in the dirty environment can be cleaned, according to one embodiment of the present invention, using liquefied carbon dioxide. In another embodiment of the present invention, super critical carbon dioxide is used to remove contaminants from the articles. Rather than removing the newly cleaned articles from the pressure vessel back into the dirty environment from whence they came and thus risking contamination of otherwise cleaned articles, one embodiment of the present invention provides a second interface to the pressure vessel and basket thereby enabling the cleaned articles to be removed from the pressure vessel and placed directly into a clean environment. The removal of the cleaned articles directly into a clean environment prevents any new contaminants from being introduced to the articles or introduced to the clean room environment.

According to one embodiment of the present invention the pressure vessel and basket contained therein are substantially cylindrical. It is well known that a cylinder is one of the most basic curvilinear geometric shapes. In such a shape the curvilinear surface is formed by a locus of points at a fixed distance from a given line segment forming the axis of the cylinder. The solid enclosed by this surface and by two planes perpendicular to the axis is called a cylinder. A cylinder having a cross-section of an ellipse, parabola, or hyperbola is called an elliptical cylinder, parabolic cylinder, or hyperbolic cylinder respectively. A right circular cylinder is one in which the plain intersecting the curvilinear geometric shape occurs at a right angle. Typically in most common uses, a cylinder is taken to mean a finite section of a right circular cylinder. Similarly, a tube or tubular section is commonly known as a cylindrical shape in which the circular planer portions at each end of the cylinder are absent.

The pressure vessel and basket are, according to one environment of the present invention, a right circular cylinder and a tubular section respectively. The pressure vessel is formed by a tubular section in which a door at each end of the tubular section completes the cylindrical shape. Other geometric shapes can certainly be utilized by the present invention without departing from the scope and functionality disclosed herein. For example the pressure vessel and/or basket can be of a spherical shape. Alternatively the pressure vessel and basket can possess different shapes. While the specific shape of a pressure vessel and basket is not a driving design factor the cylindrical shape facilitates the system's ability to traverse a barrier and provide equal access to the interior basket from two separate environments.

It is well known that the mechanical interaction between a fluid and a textile can enhance a fluid's ability to remove contaminants contained within the textile. While surfactants can enhance the ability of the fluid to interact with the textile and to remove contaminants another primary mechanism used to dislodge and remove contaminants from textile fibers or other articles is the fluid's surface tension. Accordingly, mechanical agitation of textiles within a fluid environment is well known to enhance the cleaning process and indeed more contaminants are removed from textiles by friction against hard surfaces or other textiles via the rotation (agitation) of a basket about a longitudinal axis.

According to one embodiment of the present invention a manipulable and movable basket is incorporated within the pressure vessel such that textiles or other articles placed within the basket can mechanically interface with the densified fluid to enhance its cleaning effectiveness. One aspect of the present invention enables the basket to rotate about a fixed longitudinal axis. In this case the fixed longitudinal axis of rotation is a line between the first and second openings of the agitation basket. In other embodiments agitation within the basket can be achieved by other means for example vibration, ultrasonics and other "non-rotating" methodology that otherwise agitate the articles contained therein so as to enhance the removal of unwanted contaminants. Other means by which to enhance the interaction between the fluid and the articles are also contemplated including using pressurized jets, ultrasonics and the like.

Figure 3:
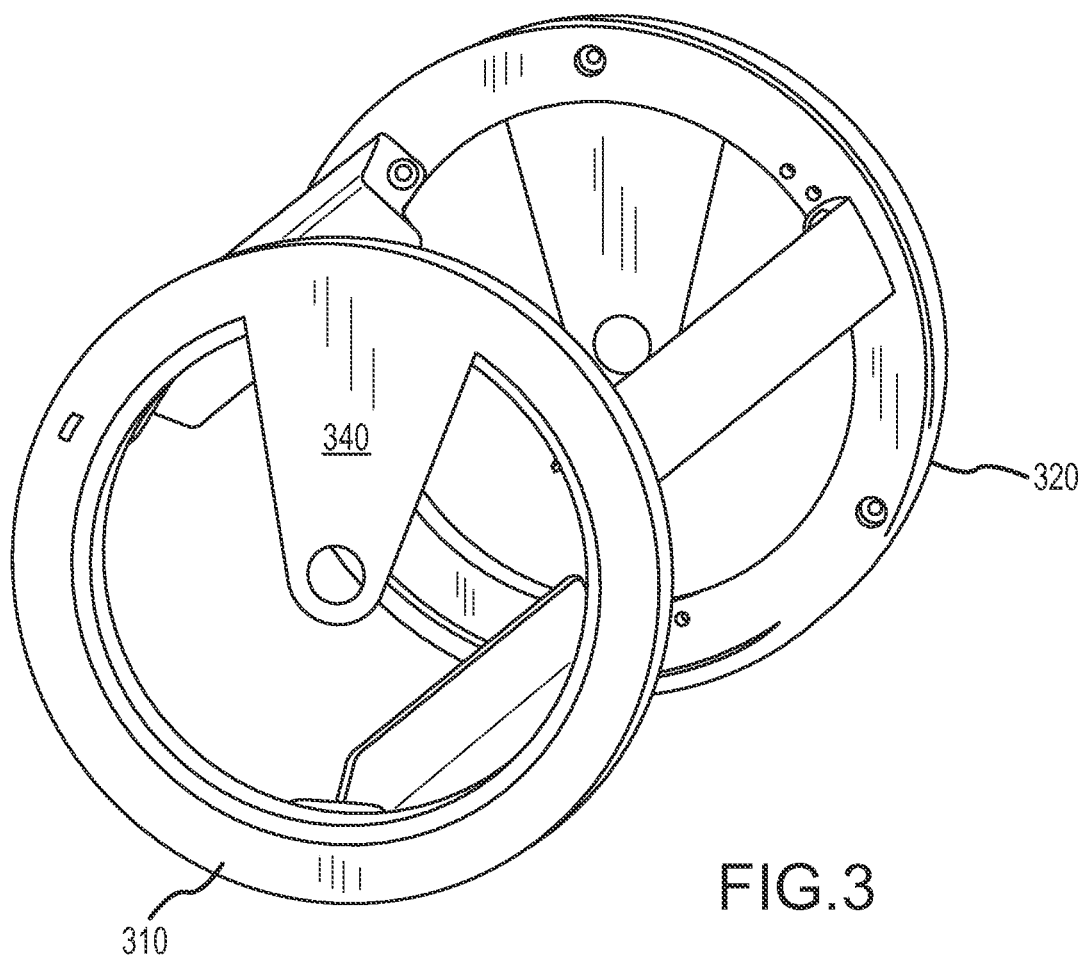
FIG. 3 shows an internal structure of a basket supported within the pressure vessel by a center hub according to one embodiment of the present invention.
Figure 4:
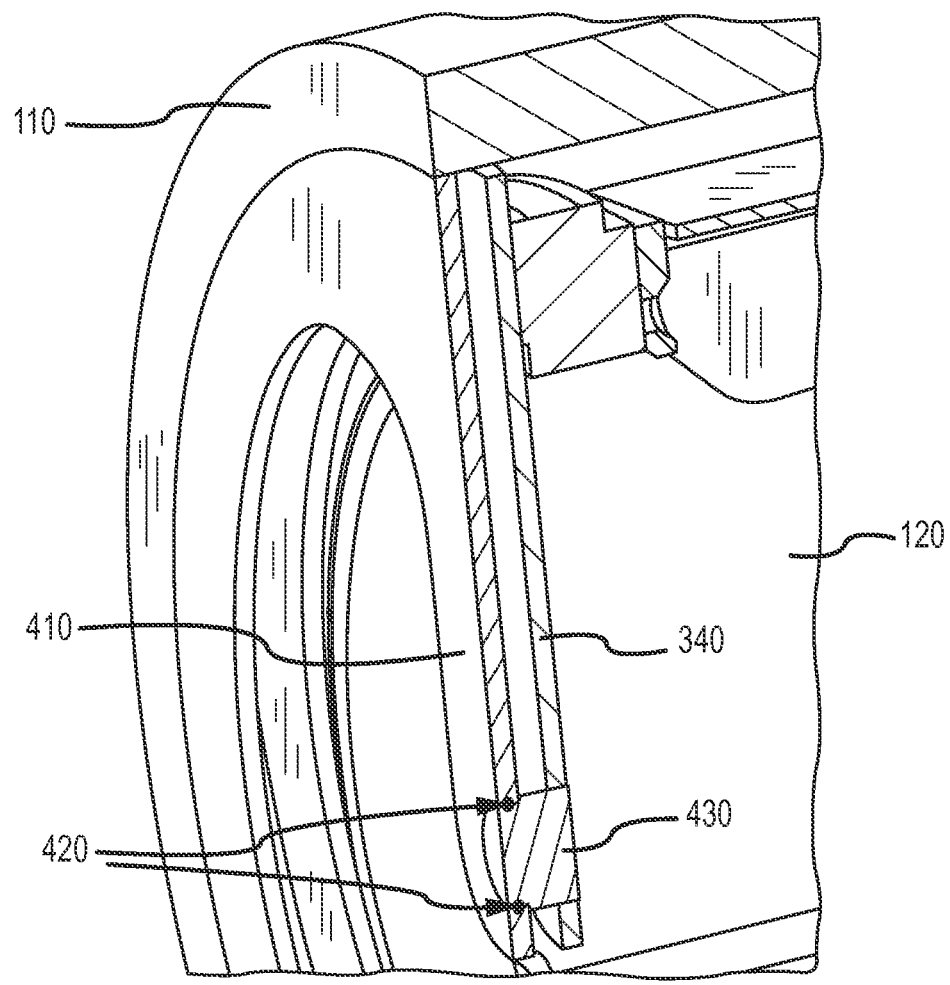
FIG. 4 shows a detailed cut away drawing of the center hub design of FIG. 3 according to one embodiment of a present invention.

One means by which to align the openings of the basket with the openings of the pressure vessel so as to provide access to the cleaning region within the basket from either environment is to suspend the basket within the vessel by a series of rollers or by a center support. FIG. 3 and FIG. 4 provide a depiction of a center support design in which a rotatable basket is supported by a stub shaft. The basket structure 320 includes one or more central attachment arms 340 that engages a stub shaft 430 coincident with the central axis of the basket. The stub shaft interfaces with a bearing 420 housed, in one embodiment, within a fixed plate 410 that extends from, and is secured to, the interior of the pressure vessel 110. In another embodiment of the present invention the bearing 420 can housed within a central attachment arm 340 associated with the basket allowing the basket to rotate about a fixed shaft 430. As the basket rotates on the stub shaft or as the stub shaft rotates within the bearing located with the fixed plate 410, articles within the basket can tumble in and out of the densified fluid facilitating interaction between the articles and the densified fluid. While portions of the basket are blocked by the support structure 340, the majority of the opening can still provide access to the basket's contents. By securing the support structure 410 to the pressure vessel the position of the basket with respect to the pressure vessel is fixed minimizing transitory vibrations and aiding in the overall installation and maintenance. As one of reasonable skill in the relevant art will appreciate other implementations of the concepts presented here can be employed without departing from the scope of the present invention. For example the configuration of the structure supporting the basket within the pressure vessel described above can take may shapes and forms while still providing a means by which the basket can rotate or be manipulated so as to enhance the interaction between the densified fluid and the articles within the basket.

Figure 5:
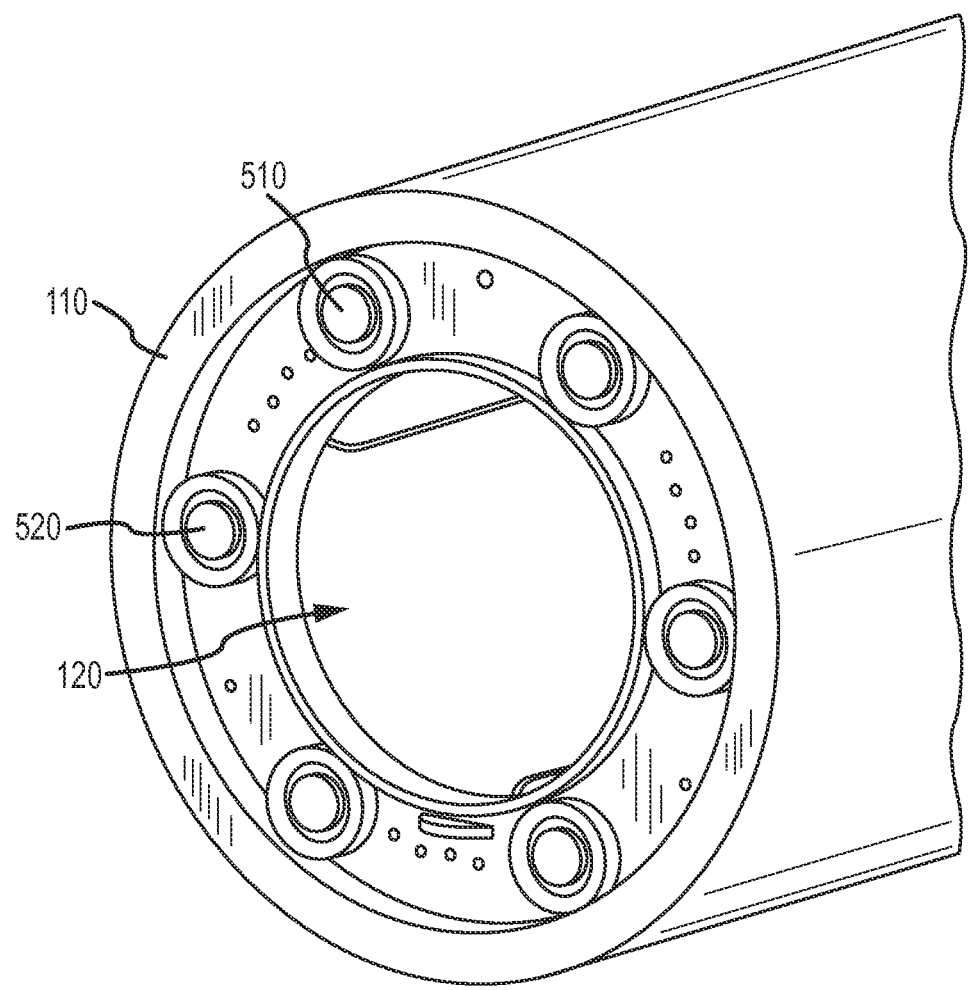
FIG. 5 is a perspective drawing of a means to position and support a basket within a pressure vessel using rollers according to one embodiment of the present invention.

Another embodiment of the present invention supports the basket using metal, plastic, composite rollers and the like that can operate in a pressurized environment and rotate on rolling element bearings. FIG. 5 shows, according to one embodiment of the present invention, a means to support a movable basket within a pressurized vessel. In this example, rolling element bearings interposed between the exterior of the basket and the interior wall of the pressure vessel, or similar structure, secure the basket such that its respective openings are accessible by the first and second sealable doors while still maintaining the ability to facilitate mechanical interaction between the densified fluid and the articles being cleaned by the rotation of the basket.

Figure 6:
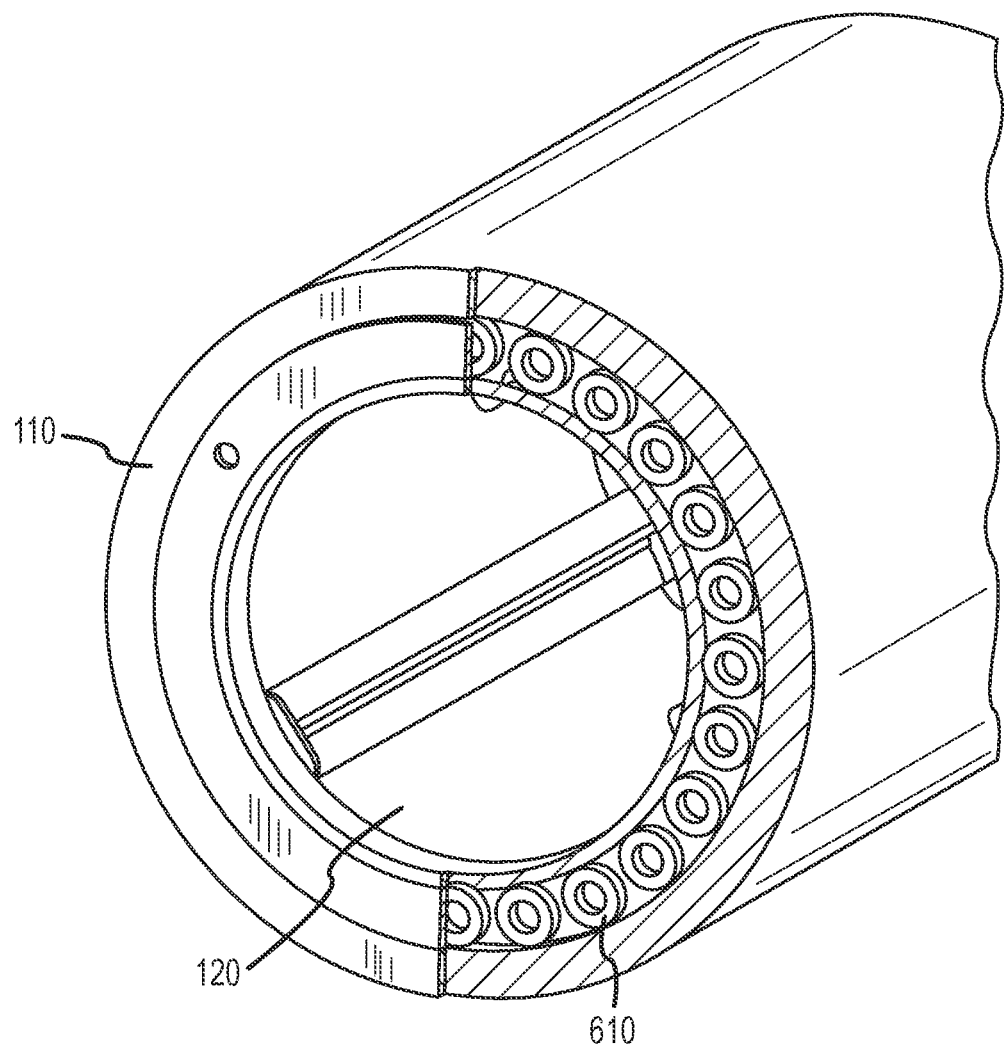
FIG. 6 is a perspective drawing of another means to position a basket within a pressure vessel using a free internal roller design according to one embodiment of the present invention.

FIG. 6 depicts a related embodiment, according to the present invention, for positioning a moveable basket within pressure vessel 110 wherein the basket is positioned on rollers 610 that are set on tracks interposed between the exterior surface of the basket 120 and the interior surface 110 of the vessel.

In an alternative embodiment, (not shown) the rotating basket 110 includes on each cylindrical end an outer ring wherein each outer ring includes a number of wheels mounted around the outer circumference of each outer ring. Each wheel is accommodated on the outer circumference of the outer ring and coupled to the outer ring by a rotation axis in the outer ring that allows rotation of the wheel in the plane of rotation of the outer ring thereby allowing the basket to rotate. Each wheel can be driven by a internal common gear wheel within the outer ring. The internal gear wheel is connected to a drive motor outside of the high pressure vessel 110 by a transmission which is arranged at the inner circumference of the outer ring.

By arranging wheels on the outer circumference of the outer rings of the rotating basket, the basket can be positioned permanently at a desired distance from the inner walls of the high pressure vessel. This reduces the risk of the basket contacting the pressure vessel when the doors of the washing unit are in open position. Also, this arrangement can reduce or eliminate the required lift of the basket when the engagement mechanism of yet another embodiment (see below) engage the basket.

While this and the previous design provide a stable rotatable configuration of the basket the bearings/rollers are positioned within a pressure vessel and within the densified fluid environment. Liquid carbon dioxide and other densified fluids possess the ability to remove petroleum products and other lubricants from articles and any machinery within the vessel. This advantageous characteristic with respect to cleaning textiles and other articles has a detrimental effect with respect to any mechanism subjected to a cyclic load or bearings that must operate, or rotate, under a load. The lubricants contained within such bearings would be quickly depleted.

To alleviate this problem and according to another embodiment of the present invention the bearings supporting the rotation of the basket are positioned outside of the pressurized environment. FIG. 7 is a side cut away view of a bearing/actuator mechanism 755 for supporting a movable basket within a pressure vessel. As shown in this depiction the basket 120 is supported by a pair of rotatable and translatable support actuators, one associated with each end of the basket. Each rotatable actuator 755 includes a shaft 740 that traverses a respective sealable door 220, 230 to interface with and be supported by a set of bearings 745 positioned on the outside portion of the door. Associated with the shaft is a set of seals 750 that allows the shaft to rotate but nonetheless maintains the pressure of the pressure vessel 110. In another embodiment of the present invention the bearings supporting the shaft 740 and by which the shaft 740 rotates can be positioned within the pressurized vessel 110. Moreover and as further described below, the shaft 740 and actuator plate 710 translates longitudinally toward the interior of the pressure vessel to engage the basket.

While the shaft and the drive mechanism incorporate seals to isolate the environment within the pressure vessel from that of the mechanisms that rotate and translate the actuator, one skilled in the relevant art will recognize that over time and due to normal wear and tear the seals are likely to develop leaks. The interior environment of the pressure vessel during a cleaning cycle includes, pressurized gas, such as carbon dioxide. The differential in pressure (and temperature) between the pressure vessel and the outside environment determines which states of carbon dioxide will occur. For example certain conditions can result in a leak of carbon dioxide forming dry ice. Dry ice (the solid state of carbon dioxide) can be detrimental to mechanical components. Similarly other differential environmental conditions can result in a leak of liquid carbon dioxide. Liquid carbon dioxide is a very effective solvent of petroleum products such as the lubricants found in bearings. Carbon dioxide gas however is essentially inert. Therefore a seal leak resulting in either the solid or liquid form of carbon dioxide near mechanical components can be detrimental. According to one embodiment of the present invention a secondary pressure environment is formed around the actuator drive mechanisms (both rotational and translational) as well as the bearings supporting the actuator shaft so that should a seal leak occur the components within this secondary pressurized environment will experience gaseous and/or liquid carbon dioxide and not liquid or solid carbon dioxide.

Returning to FIG. 7 and as mentioned above, the rotatable support actuator includes an actuator plate 710 having, in one embodiment, a set of actuator ramps 730 that, when interfaced with complementary ramps 720 associated with the basket, align the basket's central axis with the fixed axis of the shaft 740. At rest and with the door(s) open the actuator is withdrawn from contact with the basket. By doing so the basket rests on a support (or directly on the pressure vessel wall) slightly out of alignment with the central axis of the shaft with ample access to the interior portions of the basket for loading and unloading. In a preferred embodiment of the present invention the actuator plates 710 are retracted from engagement with the basket prior to the opening of either sealable door 220/230. Upon closing of both doors the actuator plates 710 extend the respective actuator ramps 730 to engage with the basket ramps 720 to raise the basket's central axis into alignment with the shaft fixed axis. With both doors closed and with the actuators extended so as to engage the basket, the basket's only contact with the pressure vessel is via the actuators.

The engagement actuators presented in this example can take a number of forms while still accomplishing the desired objective of aligning the central axis of the basket with the axis of the rotatable shaft. According to one embodiment of the present invention the actuator comprises a set of spokes positioned equidistantly about the actuator wherein each spoke includes an actuator ramp 730 for engaging a complementary basket ramp 720. Correspondingly, the entire edge of the basket includes the basket ramp configuration forming a cone such that regardless of the location of the interface between the actuator ramp 730 spokes and the basket ramp 720 the basket will be secured by actuator and positioned so as to align the basket central axis with that of the shaft 740. In another embodiment the entire actuator plate 710 includes or is comprised of a ring of actuator ramps 730. As the actuator shaft 740, actuator plate 710 and actuator ramp 730 extend so as to make contact with the basket ramp 730, the engagement of the inclined ramps acts to lift and center the basket about the central axis of the actuator shaft 740 using a coning effect. One skilled in the art will also recognize that the orientation and degree of slope of the ramps may vary without diminishing the scope of the present invention or the ability of the actuator to lift the basket into alignment.

In a preferred embodiment the angle of interaction between the respective ramps is between 10 and 30 degrees with an preferred angle of 22 degrees. If an angle of less than 10 degrees is used excessive travel is required to lift the basket into alignment. Moreover shallow ramps in a coning interaction can lock preventing the basket from releasing once the proper point of alignment is achieved. Alternatively the use of an angle larger than 30 degrees provides a poor mechanical advantage for lifting the basket. And while the present invention uses linear matching ramps, the angular dimensions of each ramp could vary so as to produce complementary curvilinear ramps.

In addition to the angular ramp configuration the material and coating properties are considered to enhance the engagement of the basket and actuator. In one embodiment of the present invention the actuator ramps are comprised of a material possessing a greater hardness rating respective to the basket ramps. Moreover a coating or lubrication material such as DLC (Diamond Like Carbon), WC (Tungsten Carbide) and the like can be placed on the basket or actuator ramps to enhance the ability of the actuators to engage and lift the basket. In another embodiment of the present invention the actuator pivots to allow the lower ramps to engage first and more effectively. For example in its non-engaged state the basket rests, in one embodiment, on the floor of the pressure vessel. In this position the central axis of the basket is not aligned with the central axis of the actuator shaft. If the actuator plate 710 translated toward the interior of the pressure vessel so as to engage the basket in its resting state, the lower actuator ramps 730 would engage the basket prior to upper ramps. Accordingly there is a significant moment on plate as is translates and engages the basket. In one embodiment of the present invention the actuator plate is operable to pivot slightly downward such that the upper and lower actuator ramps engage the basket ramps in concert. As the actuator continues to translate or stroke the coning effect of the ramps lifts the basket and eliminates any actuator plate pivot.

As discussed the compression of the ramps, or the stroking of the actuator, engages the basket from both ends and squeezes it into proper alignment by virtue of a simple machine; that machine being a series of concentric wedges approximating concentric cones. The stroking/compression can be accomplished by a variety of forces including compressed gas, mechanical forces (leverage), hydraulics, and electrical motors.

While the previous example describes a sealable door through which an actuator translates so as to engage and center the basket, another contemplated design of the present invention is to combine the centering functionality of the actuator plate and ramps with the door itself. In such an embodiment closing of the sealable door acts to position and drive the actuator ramps so as to lift and center the basket. With the door closed and basket centered the actuator shaft, plate and basket rotate as previously described.

Another feature of the present invention is a drive mechanism to drive the movement of the basket within the pressure vessel. Once the basket is centered a drive mechanism, described below, rotates, in one embodiment, the actuator which in-turn rotates the basket about a fixed axis. The torque to rotate the basket is delivered from the actuator system to the basket in one embodiment, via friction. As one of reasonable skill can appreciate the torque necessary to rotate, agitate, and spin a large basket containing substantial weight of wet textiles can be significant. While there is a frictional interaction between the ramps of the actuator system and the basket, the normal force necessary to convey adequate friction to meet the torque requirement can be significant and substantially larger than the force necessary to lift the basket into alignment. Especially if a lubricative or coating is used to facilitate the actuator/basket ramp interaction. According to one embodiment of the present invention a set of spring loaded tabs associated with the actuator ramps interlock with one of a plurality of channels in the basket ramp/cone. As the actuator ramps engage the basket ramp cone sufficient force is applied to lift the basket into alignment but not enough force to prevent the basket from rotationally slipping. As the actuator rotates and its associated torque is transferred to the basket, the interface between the actuator ramp and basket cone slips until the actuator tab is aligned with one of the plurality of basket channels. Upon alignment the tab extends into the channel forming a positive lateral engagement by which the transfer of torque is efficiently conveyed. Thereafter no slippage between the actuator and the basket occurs.

The basket, once positioned within the vessel and in a movable configuration is driven so as to manipulate the articles (textiles) within the basket to create interaction with the densified fluid solution using gravity. According to one embodiment the basket is driven by the one or more actuator shafts/plates that engage the basket. As described in the previous example one configuration includes a shaft extending from the exterior of each sealable door to interact with and rotate the basket. Once the actuator engages the basket and positions it so as to align with the fixed axis of the shaft, the shaft and actuator combination are used to drive the basket. According to another embodiment of the present invention a drive mechanism is positioned on the outside of the vessel and associated with one door to engage and rotate the shaft after the actuator has aligned the basket. By doing so the drive mechanism remains outside of the pressure vessel and is not subjected to the austere conditions of the cleaning environment. In other embodiments both actuator shafts are used to drive the basket. In yet another embodiment a drive mechanism drives the actuator plate rather than the shaft.

Figure 8:
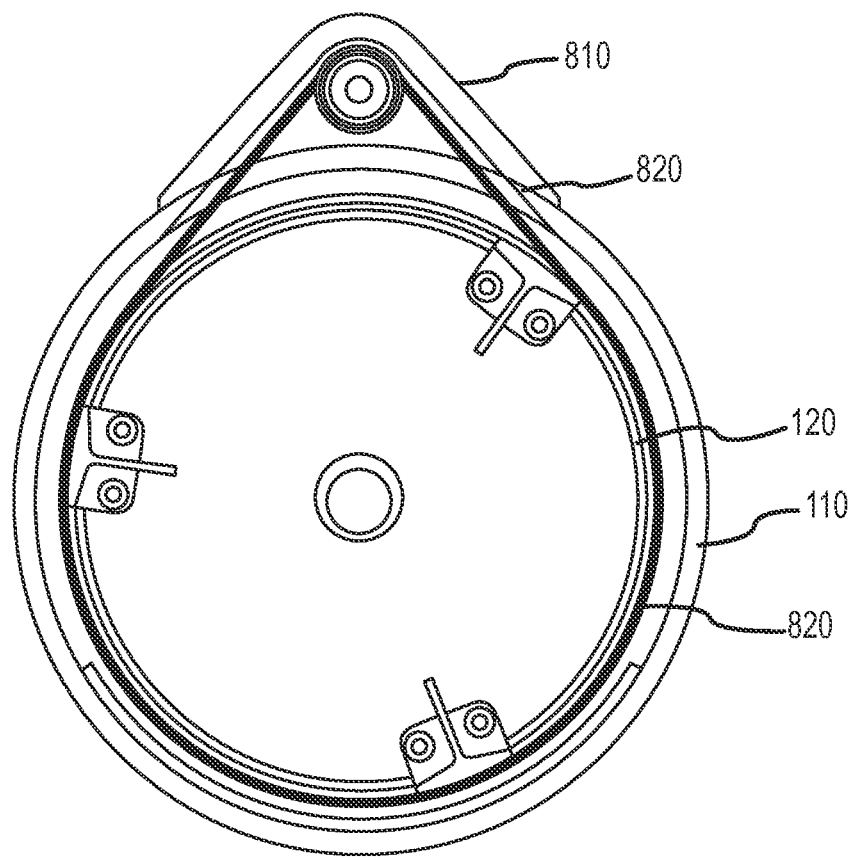
FIG. 8 is an end view of a basket within a pressure vessel and a belt drive system according to one embodiment of the present invention.

Another version of the drive mechanism can be a belt system while in another version the mechanism can be a mechanical or geared linkage. FIG. 8 provides an end view of one embodiment of a belt drive system operable to manipulate the basket within the pressure vessel. As shown a belt is configured to extend around the majority of the circumference of the basket and a drive motor. The basket 120 can be provided with a sprocket or similar system that can be driven by a belt. In other embodiments the basket does not include a sprocket but relies on a frictional mating between the belt and basket's exterior surface. One skilled in the relevant art will recognize other combinations thereof are possible and contemplated without departing from the scope of the present invention. The belt that extends around the basket can be further mounted on a drive gear or similar device located in a sub-chamber of the pressure vessel. Optionally, the belt drive comprises one or more tension pulleys that pre-stress the belt on the sprocket. In one version the drive motor is housed on the exterior of the pressure vessel in a separate chamber but still within a pressurized environment as the belt must operate within that environment. In other embodiments the drive wheel sprocket or system associated with the belt can be maintained in a common environment while a shaft can traverse a series of seals to as place the motor or drive source outside of the pressure vessel. As one of reasonable skill in the relevant art will appreciate the actual drive can be powered by a variety of means including electric, hydraulic or the like. In other embodiments pressure jets of the densified fluid internal to the basket can be used to drive (push) the motion of the basket.

Another means to drive the basket within the pressure vessel is to create, within the pressure vessel, an electric motor. An electric motor is an electromechanical device that converts electrical energy into mechanical energy. Most electric motors operate through the interaction of magnetic fields and current-carrying conductors to generate a force of some type. In an electric motor the moving part is called the rotor and the stationary part is called the stator. Magnetic fields are produced on poles, and these can be salient poles where they are driven by windings of electrical wire. Nearly all electric motors are based around magnetism. In these motors, magnetic fields are formed in both the rotor and the stator. The product between these two fields gives rise to a force, and thus a torque on the motor shaft. One, or both, of these fields must be made to change with the rotation of the motor. This is done by switching the poles on and off at the right time, or varying the strength of the pole.

According to one embodiment of the present invention, the basket could be driven by creating within the pressure vessel an electric motor. That is the basket would essentially be the rotor with the pressure vessel substantially comprising the stator. By using windings within the structure of the pressure vessel and corresponding windings in the basket magnetic fields can be generated to drive the rotation of the basket. In such a manner the drive mechanism would no longer have to traverse the pressure vessel. Various forms of electric motor configurations are contemplated within the present invention including but not limited to switched reluctance motors, coreless or DC motors, induction motors and the like.

While the drive system can be associated with either portion of the vessel located within the separate environments delineated by the barrier 210, in one embodiment of the present invention, the drive, as well as other mechanical components needed to operate the barrier densified fluid cleaning system, are positioned within the dirty side of the system. By doing so typical maintenance and servicing operations can occur on the system without comprising the integrity of the clean room environment in which the other portion of the pressure vessel interacts.

It is noted that the barrier densified fluid cleaning system according to the present invention can have a modular design, that comprises a number of washing units coupled to a single distillation unit and a single storage unit of the densified fluid such as carbon dioxide.

Figure 9:
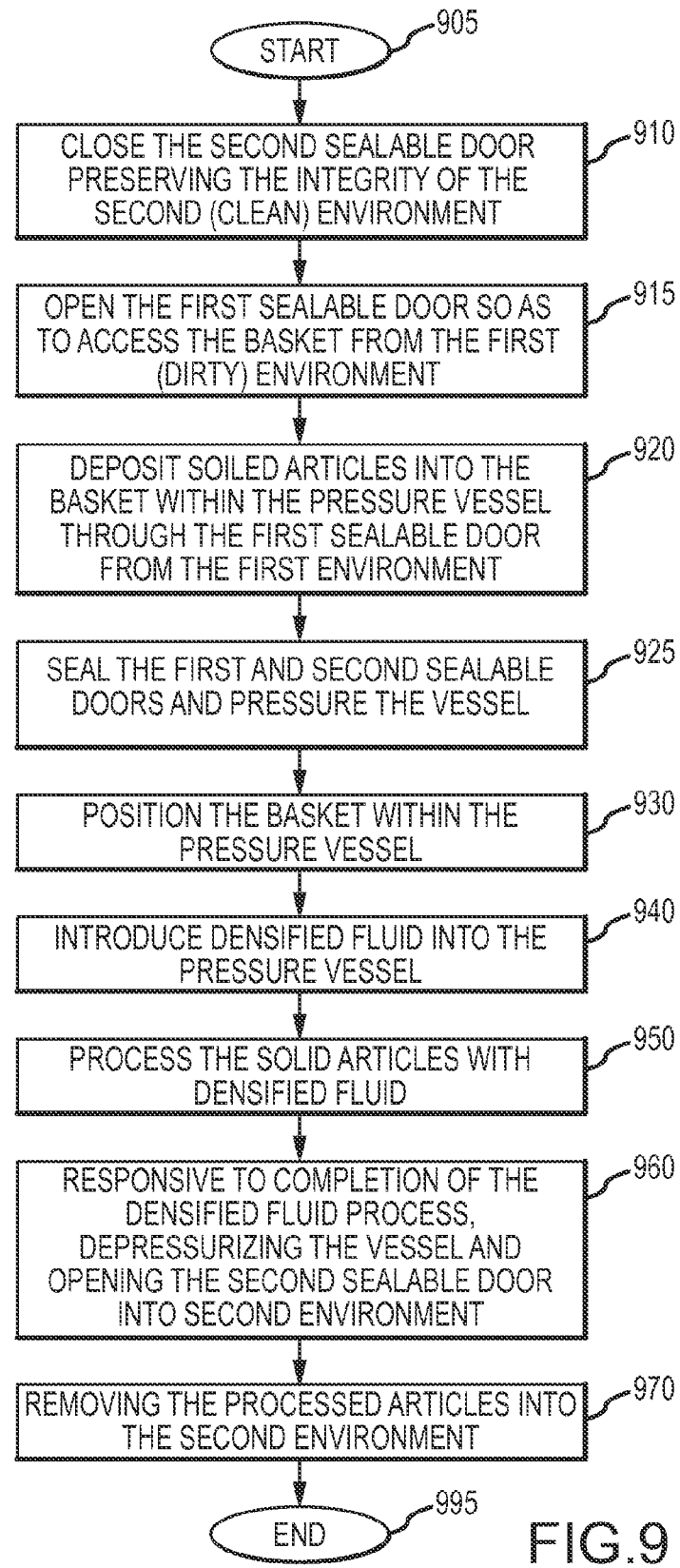
FIG. 9 is a flow chart of one method embodiment for cleaning soiled articles using densified fluid according to one embodiment of the present invention.

The barrier densified fluid cleaning system of the present invention enables soiled articles to be placed into the system from a dirty environment and removed from the same system via a separate access port that is maintained in a clean environment. FIG. 9 is a high level flowchart for a process by which to process soiled articles using the barrier densified cleaning system of the present invention. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks. In other embodiments the instructions may be embedded in firmware or hardware components.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

The process for cleaning soiled articles in a barrier densified cleaning system begins 905 with confirmation of closure 910 of the clean room door (the second sealable door) preserving the integrity of the clean room environment. Thereafter a first sealable door to the dirty environment can be opened 915 gaining access to the basket environment for loading of dirty articles to be cleaned. As implied the first sealable door is, in one embodiment, located within a first "dirty" environment. Opening the first sealable door into the dirty environment classifies the entire basket (interior region of the pressure vessel, as being dirty. Note that as the pressure vessel and basket cross the barrier, one embodiment of the present invention prevents both of the access doors to the pressure vessel to be open at the same time or for the door that interfaces with the "clean" environment be opened at all when the interior of the basket would be considered contaminated or dirty. Once the soiled articles are deposited 920 within the basket the first door is sealed 925 and the pressure vessel is pressurized.

Subsequent with the sealing of the pressure vessel and both doors being closed, the basket, according to one embodiment of the present invention, is positioned 930 such that it is capable of movement within the pressure vessel. According to one embodiment the positioning of the basket aligns the basket's central axis with a fixed axis defined by the two sealable doors. In other embodiments the positioning of the basket is independent of the sealable doors and indeed the basket may preexist in a state in which it is motion capable.

With both doors closed and sealed, densified fluid can be introduced 940 within the pressure vessel along with a variety of other surfactants and additives as needed to facilitate the cleaning process. The articles are then processed 950 within the pressure vessel and basket to remove any contaminants. While the actual motions and processes that take place within the vessel/basket are beyond the scope of the present invention, several of these processes involve the movement of the basket. As has been previously discussed, the ability for the densified fluid to remove contaminants from the soiled articles is enhanced by a mechanical (as opposed to chemical) interaction between the fluid and the article. By rotating the basket within the vessel at a speed at which the articles are subjected to tumbling within the basket and into the fluid, the surface tension of the fluid aids in dislodging and removing contaminants from the articles. These contaminants can then be extracted from the environment and be either filtered or distilled out of the fluid. Similarly spinning the basket at a high rate of speeds can assist in the removal of excess densified fluid solution at the completion of the processing cycle.

Responsive to the completion of the densified fluid processing cycle, the vessel is depressurized 960 and the second sealable door which interfaces with the second, "clean" environment is opened. The now clean articles are removed 970 from the basket and pressure vessel ending 995 the cleaning process.

With respect to the methodology presented herein, unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Furthermore any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a barrier densified fluid cleaning system and associated process through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A method for densified fluid article processing, comprising:

configuring a pressure vessel to span across a barrier, wherein the pressure vessel holds a densified fluid in a primary pressure environment having a first pressure and wherein the barrier separates a first environment and a second environment and the pressure vessel interfaces with the first environment through a first sealable opening and interfaces with the second environment through a second sealable opening;

introducing to an agitation basket from the first environment through the first sealable opening one or more soiled articles;

processing the one or more soiled articles using a densified fluid, wherein processing includes driving the agitation basket using a drive system wherein at least a portion of the drive system exists in a secondary pressure environment having a second pressure apart from the primary pressure environment by a pressure seal and wherein the first pressure is distinct from the second pressure; and responsive to processing the one or more soiled articles, removing the one or more processed soiled articles from the agitation basket through the second sealable opening into the second environment.

2. The method for densified fluid article processing according to claim 1, wherein the first environment is a dirty environment and the second environment is a clean environment.

3. The method for densified fluid article processing according to claim 1, further comprising moveably mounting the agitation basket within the pressure vessel using a plurality of wheels mounted about an outer circumference of the agitation basket operable to rotate the agitation basket within the pressure vessel on a fixed axis.

4. The method for densified fluid article processing according to claim 1, wherein the first sealable opening and the second sealable opening each include a rotatable actuator that can rotate around an actuator fixed axis.

5. The method for densified fluid article processing according to claim 1, wherein the agitation basket includes an agitation fixed axis and wherein processing includes aligning the agitation fixed axis with the actuator fixed axis.

6. The method for densified fluid article processing according to claim 5, further comprising driving the agitation basket about the agitation fixed axis.

7. The method for densified fluid article processing according to claim 1, further comprising creating within the agitation basket a mechanical interaction between one or more soiled articles and the densified fluid.

8. The method for densified fluid article processing according to claim 1, wherein the densified fluid includes supercritical carbon dioxide.

9. The method for densified fluid article processing according to claim 1, wherein the densified fluid includes liquefied carbon dioxide.

10. The method for densified fluid article processing according to claim 1, wherein processing includes particle removal and reduction, electro-static charge reduction, bacterial inactivation, disinfection or sterilization.

11. The method for densified fluid article processing according to claim 1, further comprising inhibiting opening of the second sealable opening into the second environment prior to the completed article process cycle.

* * * * *